Figures 1, 2:
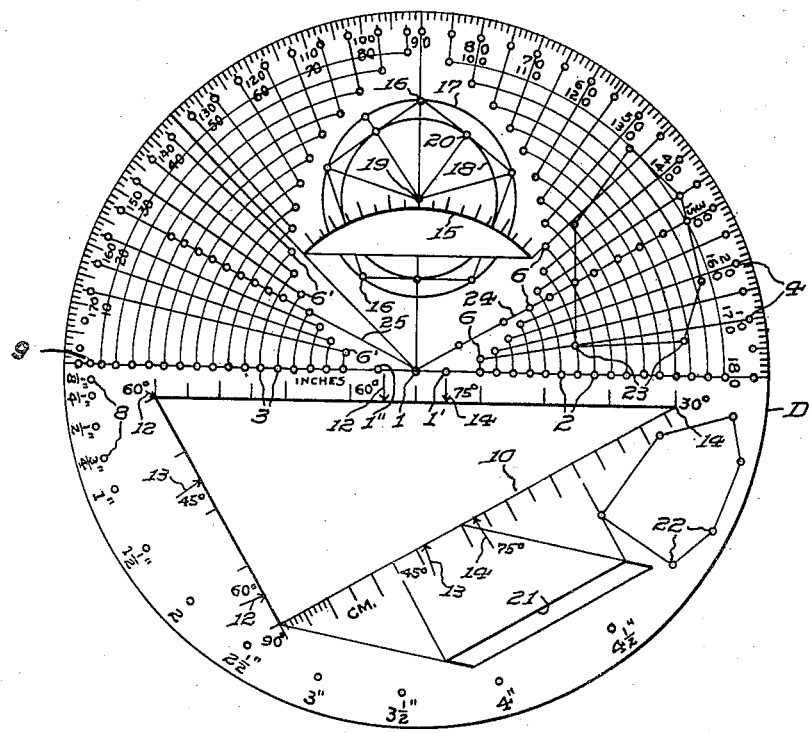

May 28, 1935.  C. W. BURT  2,003,172
GEOMETRICAL INSTRUMENT
Filed Aug. 19, 1933

WITNESS
F. J. Hartman.

INVENTOR
Carleton W. Burt.
BY George K. Helbert
ATTORNEY

Patented May 28, 1935

2,003,172

UNITED STATES PATENT OFFICE 2,003,172

GEOMETRICAL INSTRUMENT

Carleton W. Burt, Philadelphia, Pa.

Application August 19, 1933, Serial No. 685,896

1 Claim. (Cl. 33—1)

This invention relates to instruments for use in laying out and drawing arcs, angles, polygons, circles, and other geometrical figures and is particularly helpful as an aid in teaching the principles of Euclidean geometry by assisting the rapid and simplified production and reproduction of figures and constructions utilized therein.

The basic principle of Euclidean geometry that all its figure constructions may be made with the aid of a straight edge and compass is well known, and a principal object of the present invention is to provide an instrument which may be utilized as a substitute for both of the aforesaid implements in making the said constructions and which also provides a convenient protractor which readily permits the plotting of arcs and angles not easily constructed by geometric principles.

Another object of the invention is to provide an instrument of this character embodying stencils conveniently arranged in the instrument and provided with suitable markings to permit several varieties of geometrical figures to be drawn directly without preliminary geometric plotting of the points of intersection of the respective sides and the like.

A further object of the invention is to provide a geometrical instrument having perforations so arranged that by proper selection of a perforation for use as a center and suitable other perforations respectively as extremities of radii, a series of circles may be drawn having almost infinitesimal differences between their respective diameters by the employment of ordinary pencils inserted in the perforations.

Other objects, purposes and advantages of the invention will hereafter appear or be understood from the following description of one embodiment thereof in which reference will be had to the accompanying drawing, Fig. 1 of which shows a top plan view of the instrument and Fig. 2 a side elevation thereof.

As shown, the instrument comprises a circular disk D, which is preferably formed of rather stiff, transparent celluloid or other suitable material, having a perforation 1 at its center and a series of like perforations 2, 3 along a diameter, the perforations 2 being respectively disposed at distances from the center intermediate the distances of the perforations 3 on the opposite side of the center so that by inserting a pencil in perforation 1, the instrument may be held against the paper on which a construction is to be made and any one of the perforations 2 or 3 used as a radius by inserting another pencil in the selected perforation and rotating the disk thereby about the perforation 1 and the first pencil as the center.

Within the upper half of the disk as shown in Fig. 1 and adjacent its circumferential edge, I provide a plurality of perforations 4 and suitable indicia forming a protractor with respect to the center 1. The perforations 4 are preferably laid out at intervals of 5° beginning 2½° from the horizontal diameter in the 9-12 o'clock quadrant and at intervals of 5° beginning at said diameter in the 12-3 o'clock quadrant, so that by suitable manipulation of the instrument various angles within 2½° of each other may be plotted merely by making suitable marks through the perforations corresponding to points on the sides and the vertex of said angle, the latter, of course, coinciding with the center of the disk.

From each of the perforations 4 extending toward the center 1, I inscribe on the disk a ray or portion of the radius corresponding to the angle designated by that perforation and through each of the perforations 2 and 3 I inscribe arcs about the center 1; then, at the point of intersection of the ray indicating a convenient small angle (10° in the drawing) and the arc drawn from the perforation in series 2 most nearly adjacent the center, I form a perforation 6 and, working in a counterclockwise direction, I form like perforations 6 at the intersections of the succeeding arcs with their corresponding rays up to 90°. Similarly at the point of intersection of the 167½° ray with the arc from the perforation nearest the center in series 3, I form a perforation 6' and, working clockwise, other like perforations 6' at the intersections of the succeeding arcs with their corresponding rays up to 90°, the several perforations 6, 6' thus forming points on opposed curves lying on opposite sides of the line 1-90° as indicated.

Auxiliary center perforations 1', 1" on both sides of the center 1 and closely adjacent thereto are not included in either series 2 or 3, and since all the perforations heretofore mentioned lie on arcs whose center is the perforation 1, by the employment of either perforation 1' or 1" as a center instead of perforation 1, slight differences in the radii of circles formed when any of the other perforations are used may be made available. It is therefore possible by proper selection of one of the three centers referred to, to describe an almost infinite variety of arcs within the limits of the instrument itself for, as has been indicated, none of the perforations 2 are equally distant from the center 1 with any of the perforations 3, and by the provision of the two auxiliary centers 1', 1" unequally spaced from the center 1, the number of different radii which may be employed merely by the utilization of the perforations 2 and 3 is substantially tripled, while each of the centers 1', 1" affords a different radius when it serves as a center for an arc drawn with the aid of one of the perforations 6, 6'. In fact, with the aid of my device and one or more pencils, a very great number of circles, whose radii differ merely by the thickness of a penciled line, may be drawn within the limits of the maximum radius afforded by the instrument while, if desired, differences in radii even smaller than the thickness of a penciled line may be readily obtained by using in lieu of pencils instruments, such as compass points or the like, and properly selecting suitable perforations to act as center and radii.

A plurality of perforations 8 are provided in the lower half of the instrument near its edge and are marked with suitable indicia indicating their straight line distance from a perforation 9 adjacent the left hand end of the horizontal diameter, these perforations permitting circles or arcs on radii of any desired linear measurement to be readily drawn.

Additionally, the lower half of the instrument is provided with a cut-out section 10 in the form of a right triangle having its hypotenuse parallel to and slightly spaced from the horizontal diameter, thus affording a straight edge close at hand for use in connecting points plotted with the aid of the superjacent perforations and in ordinary geometrical constructions substantially eliminating the necessity for an independent straight edge. The instrument, moreover, may preferably be marked with graduations adjacent the sides of the triangle showing the linear measurement thereof in inches, centimeters and/or any other desired unit and also with indicia 12 denoting vertices of an equilateral triangle, indicia 13 indicating the acute angles of an isosceles right triangle and indicia 14 indicating the vertices of an isosceles acute triangle together with the number of degrees in their respective angles, these triangles being constructed, of course, when points made on the paper in accordance with the respective indicia are suitably interconnected by straight lines which may be drawn with the aid of the adjacent straight edges afforded by the cut-out right triangle 10.

An additional feature of my invention is the concave protractor 15 provided with indicia designating angles between 45° and 135° to the horizontal diameter and perforations 16 designating the vertices of a regular pentagon inscribed in a circle 17 and having a circle 18 inscribed within it, the centers of these circles coinciding with the perforation 19, which permits the circumscribed circle to be readily drawn by means of one perforation 16 and the inscribed circle with the aid of one of the perforations 20 indicating the points of tangency of the sides of the pentagon with said inscribed circle. It will, of course, be understood that, if desired, regular polygons of any other number of sides may be provided instead of the pentagon although the ease with which triangles, squares, hexagons and octagons may be constructed by other means afforded by the instrument renders preferable the provision of a pentagon in this connection.

In accordance with my invention I also provide the instrument with a slot 21 in the form of a narrow oblique parallelogram having two of its sides parallel to one leg of the triangle 10, as well as perforations 22 with the aid of which an irreguar polygon may readily be plotted without use of the protractor, the perforations 23 being similarly available for a like purpose.

It will be understood from the foregoing that through the medium of my instrument all geometrical constructions can be made merely by the use of two pencils in association therewith. In addition thereto, it provides a satisfactory form of protractor for plotting other constructions not included within the Euclidean principle. Other features of my invention may comprise, if desired, additional radii, such for example as the radii 24, 25 disposed at any desired angles to the horizontal diameter having series of perforations at distances from the center 1 different from any of the other perforations 2, 3 and different from each other; these will usually be employed merely for convenience in facilitating the finding of a perforation corresponding to a desired radius, and may therefore be omitted entirely without in any way limiting or interfering with the practical possibilities of my instrument.

Although I have herein described one embodiment of my invention with some particularity, it will be understood that I do not intend to thereby restrict or confine myself specifically thereto as changes and/or modifications therein which may occur to those skilled in the art may be made if desired without departing from the spirit and scope of the invention as defined in the appended claim.

Having thus described my invention, I claim and desire to protect by Letters Patent of the United States:

A geometrical instrument comprising a sheet of transparent material having a center perforation and other perforations adjacent but unequally spaced therefrom, a series of regularly spaced perforations along each of two opposed radii, the perforations in one series being respectively spaced from the center at greater distances than the corresponding perforations in the other series, arcs inscribed on the sheet respectively intersecting said radii at progressively increasing distances from the center, other perforations adjacent the outer edge of the instrument spaced to correspond with a progressively increasing series of angles having their vertices at said center and one side in coincidence with one of said radii, rays respectively extending from said last mentioned perforations toward the center perforation, and perforations respectively disposed at the intersection of each ray with the arc spaced from the center a distance substantially corresponding to its angle.

CARLETON W. BURT.